United States Patent
Kamio

(10) Patent No.: US 7,266,066 B2
(45) Date of Patent: Sep. 4, 2007

(54) INFORMATION RECORDING APPARATUS AND INFORMATION RECORDING METHOD

(75) Inventor: Hiroyuki Kamio, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 574 days.

(21) Appl. No.: 10/943,129

(22) Filed: Sep. 17, 2004

(65) Prior Publication Data

US 2005/0069299 A1 Mar. 31, 2005

(30) Foreign Application Priority Data

Sep. 30, 2003 (JP) .............................. 2003-339979

(51) Int. Cl.
*G11B 5/09* (2006.01)
(52) U.S. Cl. .................. 369/53.2; 369/53.41; 369/47.1
(58) Field of Classification Search ...................... None
See application file for complete search history.

(56) References Cited

U.S. PATENT DOCUMENTS 7,184,648 B1 * 2/2007 De Haan ...................... 386/95

2003/0091342 A1 5/2003 Shibutani et al.
2003/0123861 A1 * 7/2003 Kanai et al. ................. 386/126

FOREIGN PATENT DOCUMENTS

| EP | 1 102 275 A2 | 5/2001 |
| JP | 2001-143439 | 5/2001 |
| JP | 2003-151215 | 5/2003 |

* cited by examiner

*Primary Examiner*—Muhammad Edun
(74) *Attorney, Agent, or Firm*—Pillsbury Winthrop Shaw Pittman, LLP

(57) ABSTRACT

An information recording apparatus comprises a reception unit configured to receive image signals, a stream generation unit configured to generate a stream formed by continuously arranging a plurality of pieces of VOBU adhering to a DVD-VR standard from the image signals received by the reception unit, a management information generation unit configured to generate management information of the stream generated by the stream generation unit, a control unit configured to arrange part of the management information generated by the management information generation unit in reserve areas in a plurality of pieces of VOBU constituting the stream respectively, and a recording unit configured to record the stream in which part of the management information is arranged by the control unit and the management information in a recording medium.

14 Claims, 8 Drawing Sheets

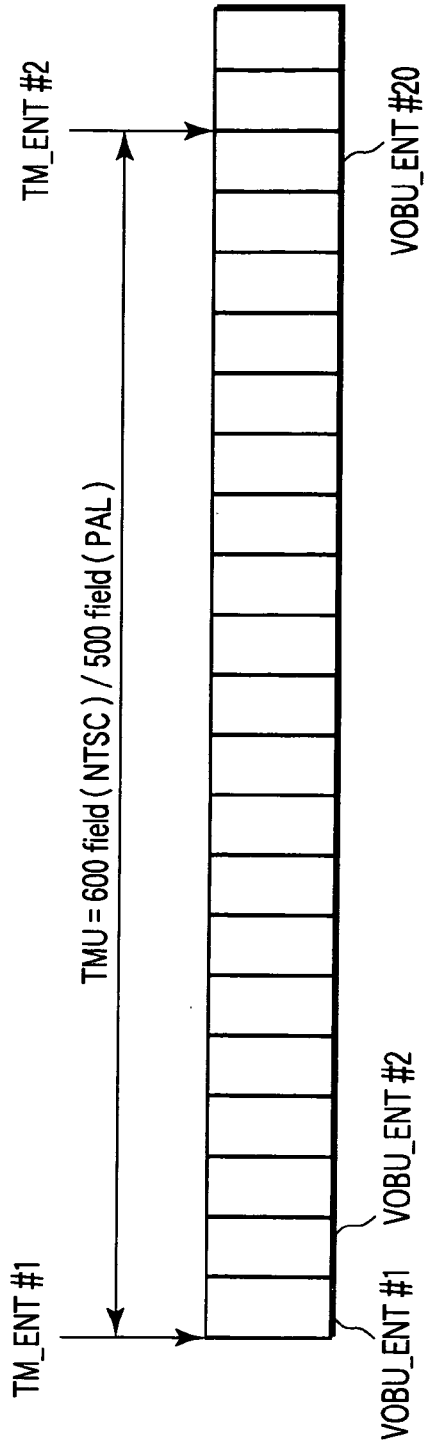
F I G. 6
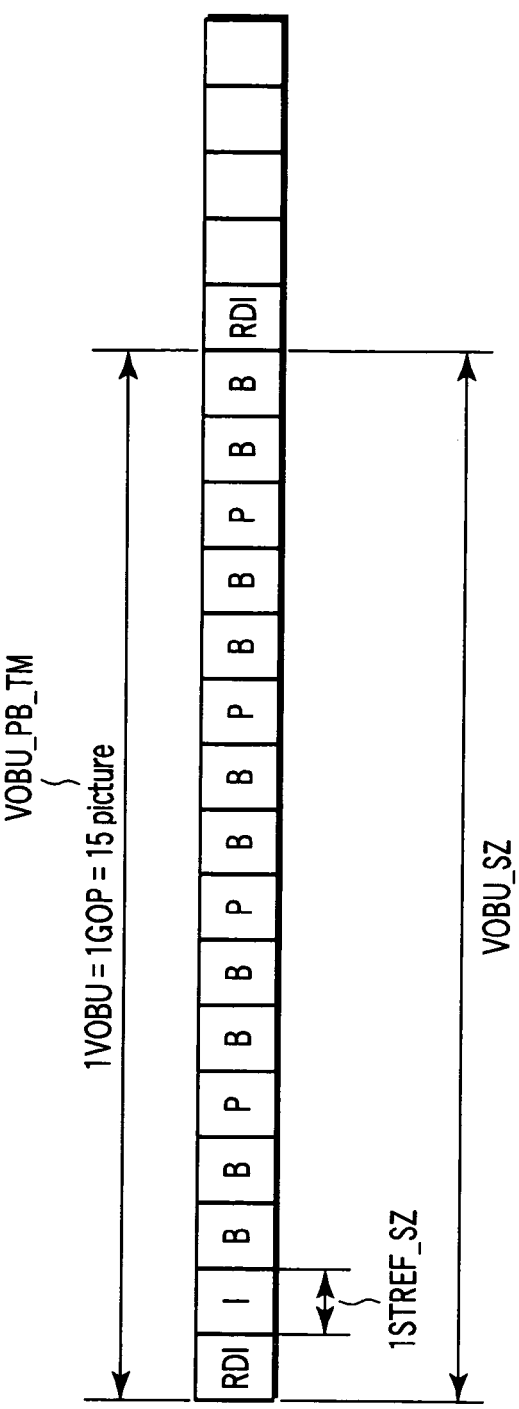
F I G. 7

FIG. 8

RDI-PCK

| Field name | Byte length | Value | Contents | Remarks |
|---|---|---|---|---|
| packet_start_code_prefix | 3 | 000001h | | DVD-VR standard |
| stream_id | 1 | 10111111b | private_stream_2 | Ditto |
| PES_packet_length | 1 | 07D4h | | Ditto |
| sub_stream_id | 1 | 01010000b | Private data area | Ditto |
| RDI_GI | 16 | | Real-time Data Information data area | Ditto |
| DCI_CCI | 8 | | | Ditto |
| | | | Mnufacturer's Information (1979bytes) | |
| reserved | 3 | 000000h | | Ditto |
| MNF_ID | 32 | → | Blank (20h) after "DVD-Video Info" | Jpn. Pat. Appln. KOKAI Publication No. 2001-345303 |
| reserved | 2 | 0000h | alignment | Ditto |
| VERSION | 2 | 0101h | Version.1 | Ditto |
| reserved | 3 | 000000h | Alignment | Ditto |
| VOBU_2NDREF_EA | 4 | | | Ditto |
| VOBU_3RDREF_EA | 4 | | | Ditto |
| reserved | 2 | 0000h | Alignment | Ditto |
| VOBU_A_SYNCA | 2 | | | Ditto |
| PIC_TYPE0 | 1 | | | Ditto |
| PIC_ADDR0 | 4 | | | Dito |
| PIC_LENGTH0 | 4 | | | Ditto |
| Information PIC2~PIC13 | : | | | Ditto |
| PIC_TYPE14 | 1 | | | Ditto |
| PIC_ADDR14 | 4 | | | Ditto |
| PIC_LEGTH14 | 4 | | | Ditto |
| ISTREF_SZ | 1 | | Size of leading end I-Picture (number of logical blocks) | The embodiment |
| VOBU_PB_TM | 1 | | VOBU reproduction time (number of fields) | Ditto |
| VOBU_SZ | 2 | | VOBU size (number of logical blocks) | Ditto |
| reserved | 1786 | | | |

INFORMATION RECORDING APPARATUS AND INFORMATION RECORDING METHOD

CROSS-REFERENCE TO RELATED APPLICATIONS

This application is based upon and claims the benefit of priority from prior Japanese Patent Application No. 2003-339979, filed Sep. 30, 2003, the entire contents of which are incorporated herein by reference.

BACKGROUND OF THE INVENTION

1. Field of the Invention

The present invention relates to improvement of an information recording apparatus and information recording method for recording a stream such as image and sound and management information of the stream on a recording medium.

2. Description of the Related Art

As is well known in the art, research and development of information high-density recording technology has recently been promoted, and an optical disk having a recording capacity as large as 4.7 GB in one layer on one side has been put into practical use.

For example, the optical disk includes read-only type digital versatile disk-read only memory (DVD-ROM), rewritable type random access memory (DVD-RAM) and rewritable (DVD-RW), and write-once type recordable (DVD-R).

In these optical disks, the management information is adapted to be created and recorded when the stream such as the image and the sound is recorded, and reproduction or search of the stream is performed based on the management information when the stream is reproduced.

The stream and its management information are individually recorded as an independent file on the optical disk. Therefore, a user can capture only the stream from the optical disk into a personal computer (PC) or the like to perform editing and rewrite the post-edit stream onto the optical disk.

In view of such usage, it is very difficult with the optical disk to always ensure consistency between two different files of the stream and its management information. That the consistency between the stream and its management information cannot be ensured is the same state as that the management information is lost and only the stream exists on the optical disk.

Jpn. Pat. Appln. KOKAI Publication No. 2001-143439 discloses a configuration in which file management information is recovered or generated so as to access AV data which has been already recorded in the case where the file management information is broken or lost during the time the AV data is recorded on the recording medium.

However, in Jpn. Pat. Appln. KOKAI Publication No. 2001-143439, the file management information is corrected or generated by reproducing the whole of the AV data recorded on the recording medium from a leading recording block, so that the operation is complicated and a long time is required.

BRIEF SUMMARY OF THE INVENTION

According to one aspect of the present invention, there is provided an information recording apparatus comprising: a reception unit configured to receive image signals; a stream generation unit configured to generate a stream formed by continuously arranging a plurality of pieces of VOBU adhering to a DVD-VR standard from the image signals received by the reception unit; a management information generation unit configured to generate management information of the stream generated by the stream generation unit; a control unit configured to arrange part of the management information generated by the management information generation unit in each reserve area in a plurality of pieces of VOBU constituting the stream; and a recording unit configured to record the stream in which part of the management information is arranged by the control unit and the management information in a recording medium.

According to another aspect of the present invention, there is provided an information recording method comprising: receiving image signals; generating a stream formed by continuously arranging a plurality of pieces of VOBU adhering to a DVD-VR standard from the received image signals; generating management information of the generated stream; arranging part of the generated management information in each reserve area in a plurality of pieces of VOBU constituting the stream; and recording the stream in which part of the management information is arranged and the management information in a recording medium.

BRIEF DESCRIPTION OF THE SEVERAL VIEWS OF THE DRAWING

FIG. 6 shows a relationship between TM_ENT and VOBU_ENT in the DVD-VR standard;

FIG. 7 shows a general structure of a stream in the DVD-VR standard;

FIG. 8 shows contents of RDI_PCK in the stream in the embodiment;

DETAILED DESCRIPTION OF THE INVENTION

Figure 1:
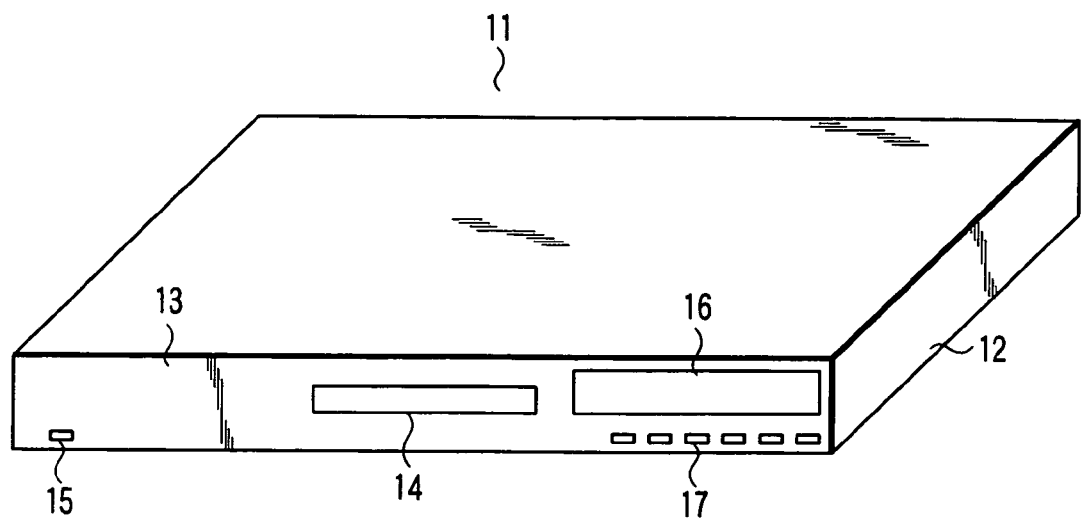
FIG. 1 is a perspective view showing an appearance of an optical disk apparatus in an embodiment of the invention.

Referring to the accompanying drawings, a preferred embodiment of the invention will be described in detail. FIG. 1 shows an appearance of an optical disk apparatus 11 described in the embodiment. The optical disk apparatus 11 has a cabinet 12 formed in a substantially thin box shape.

A disk drive unit 14 is placed in the central portion of a front panel 13 of the cabinet 12. The disk drive unit 14 is configured to be able to load and unload a later-mentioned optical disk. The disk drive unit 14 has a function of performing the recording and reproduction of information on and from the loaded optical disk.

A power key 15 is placed in one end portion of the front panel 13 of the cabinet 12. A display unit 16 for displaying an operating state, a setting state, and the like, an operation unit 17 for setting the optical disk apparatus 11 in a predetermined state or a stopped state, and the like are placed on the other end portion of the front panel 13.

Figure 2:
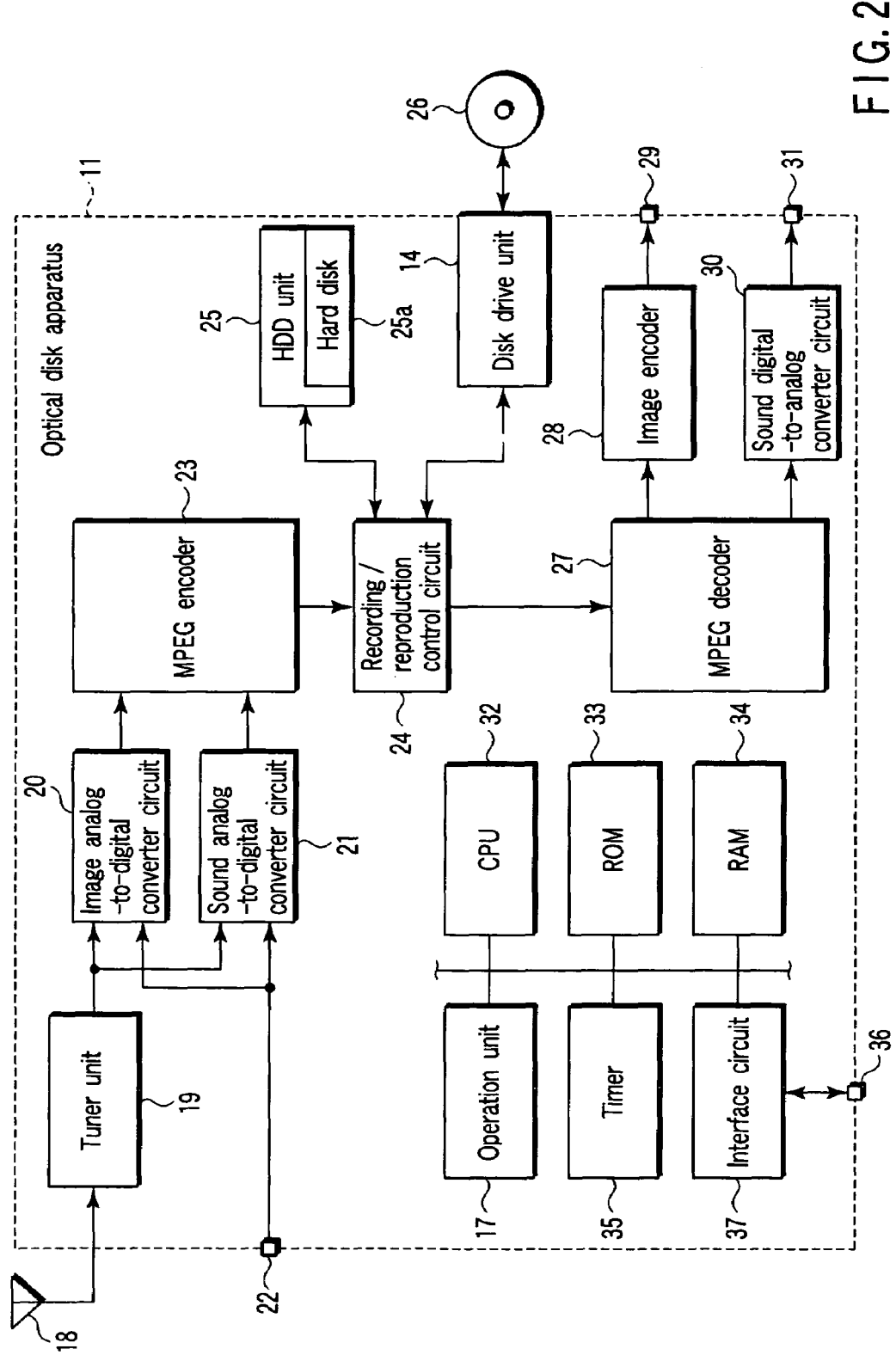
FIG. 2 is a block diagram showing a signal processing system of the optical disk apparatus in the embodiment.

FIG. 2 shows a signal processing system of the optical disk apparatus 11. A television broadcast signal received by an antenna 18 is provided to a tuner unit 19 to select a television signal of a predetermined broadcast channel.

The television signal selected by the tuner unit 19 is provided to an image analog-to-digital converter circuit 20 and a sound analog-to-digital converter circuit 21, and an image signal and a sound signal are digitized respectively.

The image signal and sound signal which are input from an external input terminal 22 are provided to the image analog-to-digital converter circuit 20 and sound analog-to-digital converter circuit 21 to be digitized respectively.

The image signal and sound signal which have been digitized by the image analog-to-digital converter circuit 20 and sound analog-to-digital converter circuit 21 are provided to a moving picture experts group (MPEG) encoder 23.

While the MPEG encoder 23 converts the input image signal and sound signal into the stream in the form of an MPEG 2 format adhering to a video recording (DVD-VR) standard, the MPEG encoder 23 generates the management information of the stream.

The stream and its management information which have been output from the MPEG encoder 23 are provided to a recording/reproduction control circuit 24. The recording/reproduction control circuit 24 has the function of controlling a hard disk drive (HDD) unit 25 to record the stream and its management information in a hard disk 25a.

The recording/reproduction control circuit 24 also has the function of controlling the disk drive unit 14 to record the stream and its management information on an optical disk 26 such as DVD-RAM loaded in the disk drive unit 14.

In this case, the stream and management information which have been output from the MPEG encoder 23 can be selectively recorded only on the hard disk 25a, only on the optical disk 26, or on both the hard disk 25a and the optical disk 26.

The recording/reproduction control circuit 24 has the function of controlling the HDD unit 25 to read the stream from the hard disk 25a based on the management information. The recording/reproduction control circuit 24 also has the function of controlling the disk drive unit 14 to read the stream from the optical disk 26 based on the management information.

In this case, the stream can be selectively read from either the hard disk 25a or the optical disk 26. The stream which has been read from the hard disk 25a or the optical disk 26 is provided to an MPEG decoder 27 through the recording/reproduction control circuit 24.

The MPEG decoder 27 performs decode processing corresponding to the MPEG 2 format to the input stream and outputs the digitized image signal and sound signal. After the image signal is provided to an image encoder 28 and the predetermined encode processing is performed to the image signal, the image signal can be led to the outside through an image output terminal 29.

After the digital sound signal output from the MPEG decoder 27 is provided to a sound digital-to-analog converter circuit 30 to be changed to an analog format, the sound signal can be led to the outside through a sound output terminal 31.

The recording/reproduction control circuit 24 also has the function of controlling the HDD unit 25 and the disk drive unit 14 so as to read the information recorded in the hard disk 25a to record the information on the optical disk 26 or so as to read the information recorded on the optical disk 26 to record the information on the hard disk 25a.

At this point, the above-described series of recording/reproducing operations is totally controlled by a central processing unit (CPU) 32. The CPU 32 controls each circuit so as to reflect operational contents of the operation unit 17 based on a control program stored in a ROM 33 while using a RAM 34 as a work area.

A timer 35 and an interface circuit 37 are connected to the CPU 32. The timer 35 obtains time information for the purpose of a reserved recording function and the like, and the interface circuit 37 connects an external PC or the like to an input/output terminal 36 to perform data communication.

Figure 3:
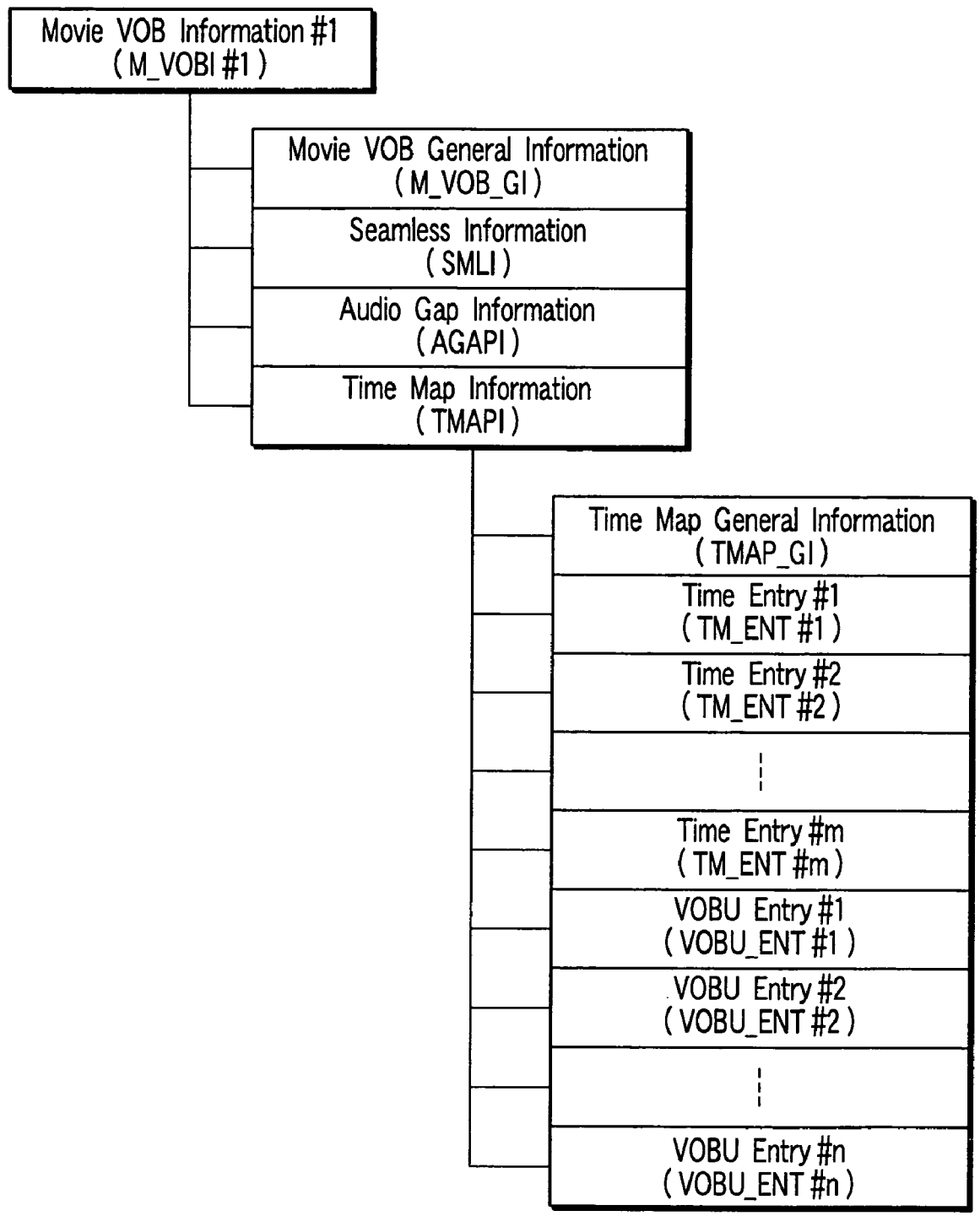
FIG. 3 shows a data structure of a part concerning M_VOBI in a DVD-VR standard.

FIG. 3 shows a data structure of a part concerning movie video object information (M_VOBI) in the DVD-VR standard. When the optical disk apparatus 11 performs the recording processing, the information on the stream to be recorded is retained in the information of M_VOBI in a management information file named VR_MANGR.IFO.

M_VOBI includes movie video object general information (M_VOB_GI) on the whole of M_VOBI, seamless information (SMLI) necessary to perform seamless reproduction with the immediately preceding M_VOBI, audio gap information (AGAPI) which describes an audio gap, and time map information (TMAPI) of an area where a time map is retained.

TMAPI includes time map general information (TMAP_GI), time entry information (TM_ENT) #1 to #m, and video object unit entry (VOBU_ENT) information #1 to #n.

Figure 4:
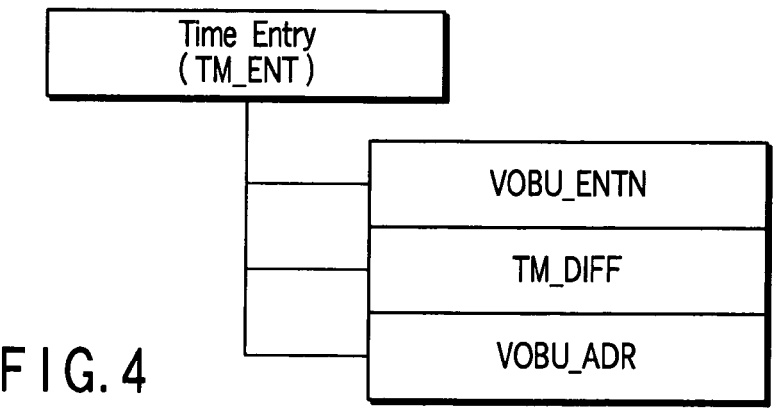
FIG. 4 shows a detail of TM_ENT in M_VOBI in the DVD-VR standard.

FIG. 4 shows a detail of the time entry information TM_ENT in the time map (TMAP) information. TM_ENT is the information which is provided in each 600 fields in the national television system committee (NTSC) system or in each 500 fields in the phase alternation by line (PAL) color television system.

TM_ENT includes video object unit entry number (VOBU_ENTN) which describes the number of VOBU_ENT which exists in a position of TM_ENT, time difference (TM_DIFF) in which a shift from a leading end of VOBU to the position of TM_ENT is expressed by the number of fields, and video object unit address (VOBU_ADR) in which the position from the leading end of M_VOBI of VOBU is expressed by the number of logical blocks.

Figure 5:
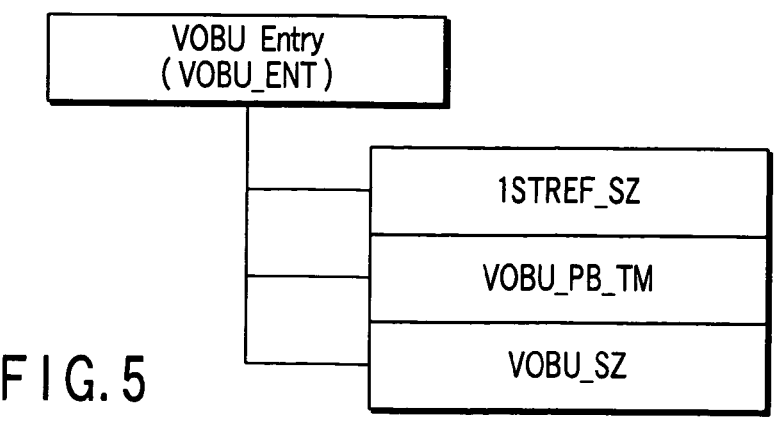
FIG. 5 shows a detail of VOBU_ENT in M_VOBI in the DVD-VR standard.

FIG. 5 shows the detail of the VOBU entry information VOBU_ENT in the time map (TMAP) information. VOBU_ENT includes first reference size (1STREF_SZ) in which a size of an intra-coded (I) picture of an intra-frame coding frame of the leading end of VOBU is described by the number of logical blocks, video object unit playback time (VOBU_PB_TM) in which a reproduction time of VOBU is described by the number of fields, and video object unit size (VOBU_SZ) in which the size of VOBU is described by the number of logical blocks.

VOBU_ENT is utilized as navigation information for searching the target I picture without analyzing the interior of the stream, when a special reproduction such as forward-direction skip reproduction or reverse reproduction is performed.

FIG. 6 shows a relationship between TM_ENT and VOBU_ENT. The information TM_ENT can be worked out only by calculation when the information VOBU_ENT exists. Because an interval of TM_ENT is constant, VOBU_ENTN can be determined as the number of VOBU_ENT exceeding TMU by adding the pieces of VOBU_PB_TM in VOBU_ENT.

TM_DIFF is difference in which a total value of VOBU_PB_TMs exceeds the value of TMU. VOBU_ADR can be calculated by adding VOBU_SZ from the leading end of M_VOBI. That is, the information TM_ENT can be worked out by the calculation when all the pieces of information VOBU_ENT are prepared.

The information TMAP is the information for high-speed searching for the position where the I picture is located in the stream in the DVD-VR standard, and there should not be a mismatch between stream data and TMAP data.

It is considered that the optical disk apparatus 11 and PC are coordinated with each other by connecting the PC to the input/output terminal 36 of the optical disk apparatus 11. For example, it is considered that the stream data recorded on the hard disk 25a or the optical disk 26 is transferred to the PC to edit the stream data and the original stream data recorded on the hard disk 25a or the optical disk 26 is rewritten by the post-edit stream data.

In this case, in order to adhere to the DVD-VR standard, it is necessary that not only the stream data but also the management information described in an IFO file are simultaneously transferred to the PC to perform the rewrite corresponding to the edit contents.

However, in the case where the stream data can be transferred to the PC which is of the system having a higher degree of freedom for users, it is actually difficult to always surely hold consistency between the stream data and the management information.

That is, it should be previously assumed that the stream data is inconsistent with its management information. When the stream data is returned from the PC to the optical disk apparatus 11, it is necessary to prepare a mechanism which can generate the management information only from the stream data.

FIG. 7 shows a general structure of the stream in the DVD-VR standard. In an example shown in FIG. 7, the stream is configured by continuously arranging a plurality of pieces of unit information which is of VOBU including a predetermined amount of information. One VOBU includes one group of pictures (GOP), and one GOP includes 15 pictures.

RDI_PCK is described at the leading end of VOBU, and subsequently a packet of the I picture is recorded. In addition, however, there are also a sound packet, a sub-image packet, and the like, those will be omitted for the sake of convenience.

FIG. 7 shows parts expressed by each of 1STREF_SZ, VOBU_PB_TM, and VOBU_SZ which are included in VOBU_ENT shown in FIG. 5. 1STREF_SZ is the information in which the size of the I picture is expressed by the number of logical blocks.

VOBU_PB_TM is the information in which the reproduction time of 1VOBU (15 pictures) is expressed by the number of fields. In this case, VOBU_PB_TM becomes 30 fields. VOBU_SZ is the information in which the size of the one VOBU is expressed by the number of logical blocks.

Each of 1STREF_SZ, VOBU_PB_TM, and VOBU_SZ can be generated when the interior of the stream is analyzed. However, to that end, it is necessary to read at least header portions of all the packets, and the processing is complicated and a long time is required.

Therefore, in the embodiment, the management information of the stream, particularly the information VOBU_ENT is adapted to be able to be reproduced from the stream at high speed. For this purpose, when the MPEG encoder 23 performs the encode processing, 1STREF_SZ, VOBU_PB_TM, and VOBU_SZ are inserted into RDI_PCK.

FIG. 8 shows the contents of RDI_PCK generated by the MPEG encoder 23. As shown in remarks, the pieces of information from the leading end of RDI_PCK to DCI_CCI are the information provided in the DVD-VR standard.

Manufacturer's information (MNFI) is a reserve area where the data can be arbitrarily written on the side of the optical disk apparatus 11. The pieces of information from MNF_ID to PIC_LENGTH14 in the pieces of the information recorded in the reserve area, as shown in remarks, are the information proposed in Jpn. Pat. Appln. KOKAI Publication No. 2003-151215 by the same inventor as the subject application.

As shown by "the embodiment" in remarks, 1STREF_SZ, VOBU_PB_TM, and VOBU_SZ which constitute VOBU_ENT follow these pieces of information from MNF_ID to PIC_LENGTH14.

Figure 9:
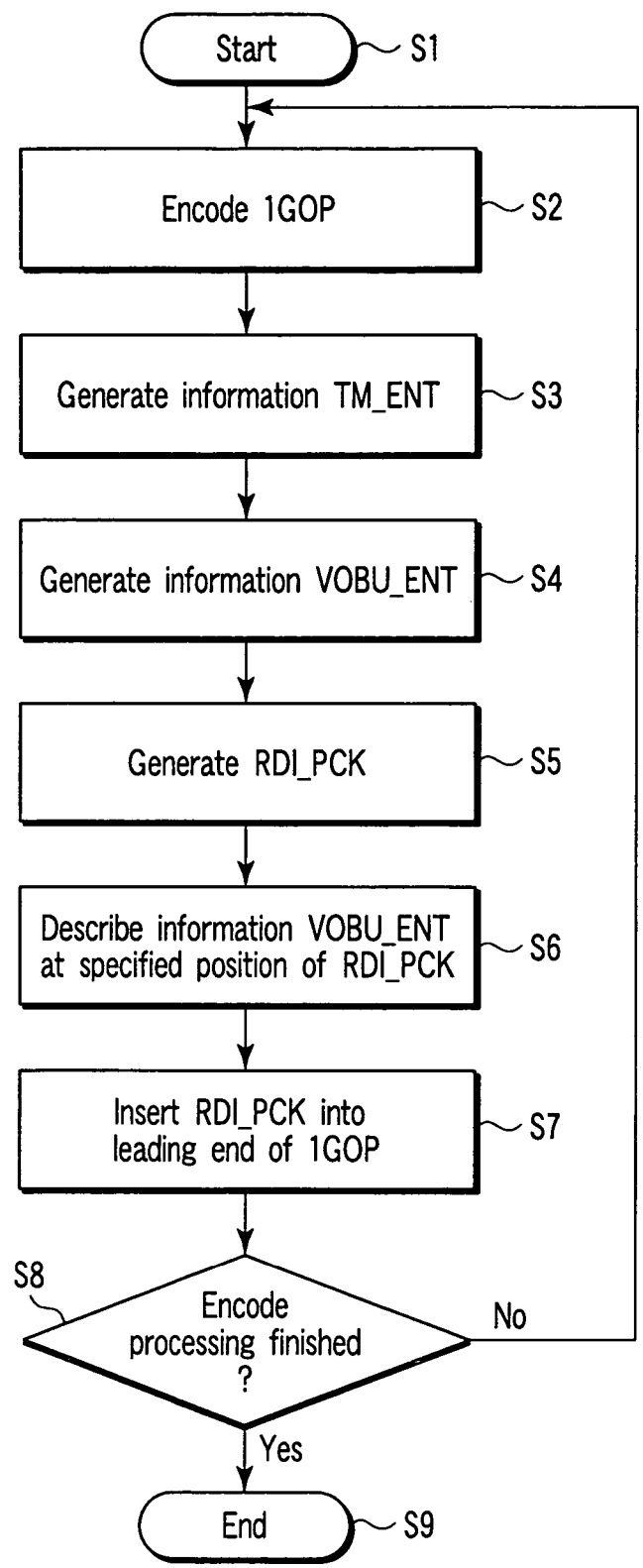
FIG. 9 is a flowchart showing an operation in which VOBU_ENT is arranged in RDI_PCK in the embodiment.

FIG. 9 is the flowchart showing the operation in which the MPEG encoder 23 arranges each of 1STREF_SZ, VOBU_PB_TM, and VOBU_SZ which constitute VOBU_ENT in RDI_PCK.

When the process is started (Step S1), the MPEG encoder 23 encodes 1GOP from the input image signal in Step S2, generates the information TM_ENT in Step S3, generates the information VOBU_ENT in Step S4, and generates the information RDI_PCK in Step S5.

In Step S6, the MPEG encoder 23 arranges each of 1STREF_SZ, VOBU_PB_TM, and VOBU_SZ which constitute VOBU_ENT at the specified positions of RDI_PCK.

In Step S7, the MPEG encoder 23 inserts RDI_PCK into the leading end of 1GOP. In Step S8, the MPEG encoder 23 decides whether the encode processing is finished or not. When the MPEG encoder 23 decides that the encode processing is not finished (NO), the process is returned to Step S2. When the MPEG encoder 23 decides that the encode processing is finished (YES), the process is ended (Step S9).

After the stream generated by the MPEG encoder 23 passes through the recording/reproduction control circuit 24, the stream is recorded on the hard disk 25a by the HDD unit 25 or recorded on the optical disk 26 by the disk drive unit 14.

In this case, the various types of pieces of management information such as TM_ENT and VOBU_ENT which are generated in the MPEG encoder 23 are also recorded in the management area of the hard disk 25a or optical disk 26 in a similar manner.

Figure 10:
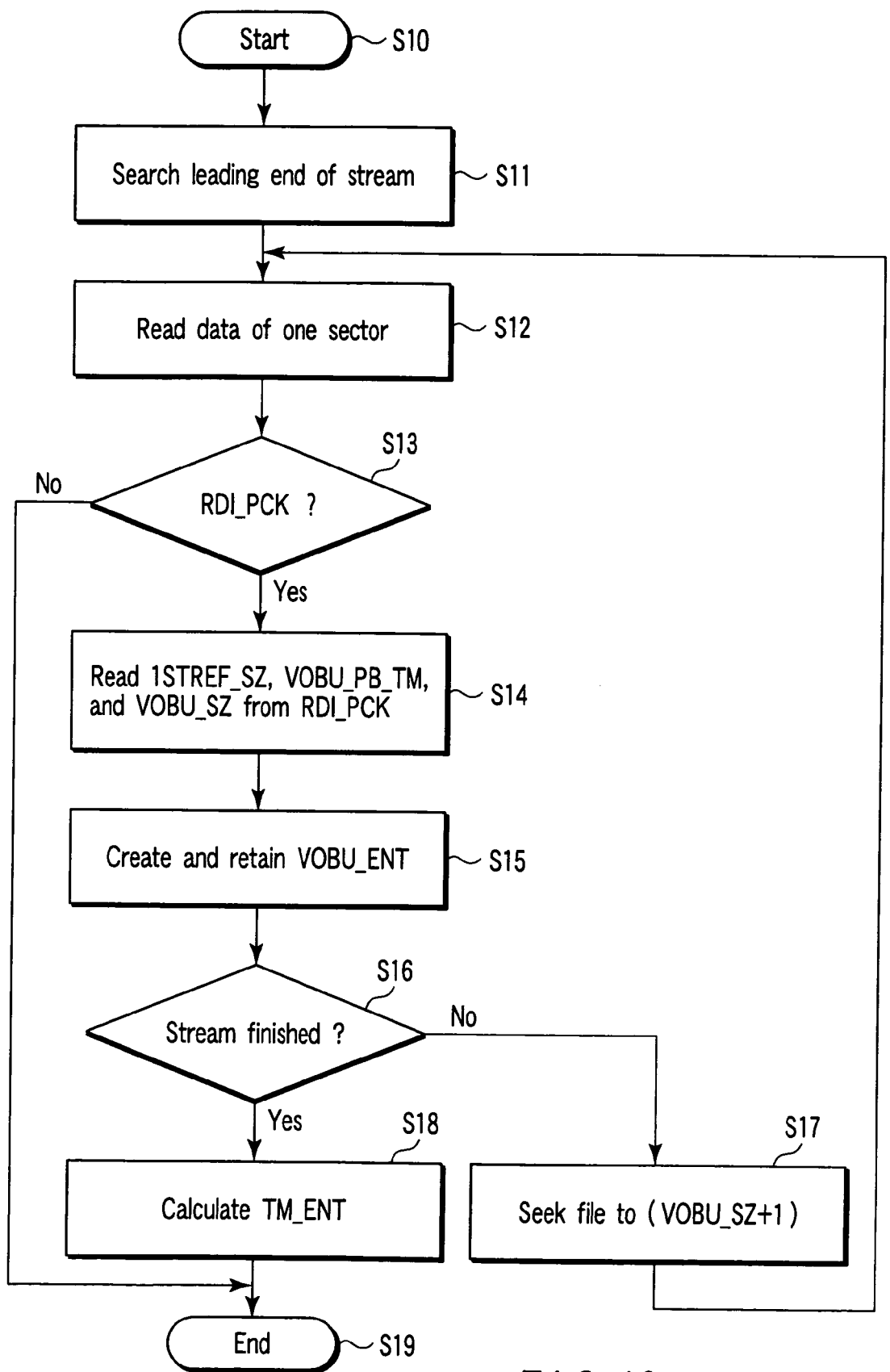
FIG. 10 is a flowchart showing the operation in which TM_ENT is restored from the stream in the embodiment.

FIG. 10 is the flowchart showing the operation in which each of TM_ENT is restored from the stream recorded on the hard disk 25a or optical disk 26. When the process is started (Step S10), the CPU 32 causes a file pointer to be sought at the leading end of the stream in Step S11.

In Step S12, the CPU 32 reads the data of leading-end one sector (=one logical block=2048 bytes). In Step S13, the CPU 32 decides whether the read data is RDI_PCK or not. When the CPU 32 decides that the read data is not RDI_PCK (NO), the process of restoring TM_ENT is ended (Step S19). When the MPEG encoder 23 decides that the read data is RDI_PCK (YES), the CPU 32 reads 1STREF_SZ, VOBU_PB_TM, and VOBU_SZ from RDI_PCK in Step S14 and creates and retains VOBU_ENT in Step S15.

In Step S16, the CPU 32 decides whether the stream is finished or not. When the CPU 32 decides that the stream is not finished (NO), since the subsequent RDI_PCK is located at the position of (VOBU_SZ+1) sector ahead of RDI_PCK, the CPU 32 causes the file to be sought by (VOBU_SZ+1) sector in Step S17 and returns the process to Step S12.

The whole pieces of VOBU_ENT in the stream can be read by repeating the operations from Step S12 to Step S17 until the stream is finished.

When the CPU 32 decides that the stream is finished in Step S16 (YES), the CPU 32 restores each of VOBU_ENTN, TM_DIFF, and VOBU_ADR which constitute TM_ENT from each of VOBU_ENT which has been already obtained by the calculation in Step S18, and the process is ended (Step S19).

Each of the restored management information such as VOBU_ENT and TM_ENT is recorded in the management area of the hard disk 25a or optical disk 26 and utilized for the reproduction of the stream.

For example, in the case where the stream recorded on the hard disk 25a is transferred to the PC to edit the stream and the post-edit stream is recorded on the hard disk 25a again, not only the post-edit stream is recorded in the data area of the hard disk 25a, but also VOBU_ENT is read from the stream to restore the TM_ENT and VOBU_ENT and TM_ENT are recorded in the management area of the hard disk 25a.

In the case where special reproduction is performed to the stream re-recorded on the hard disk 25a, the restored VOBU_ENT and TM_ENT which are recorded in the management area of the hard disk 25a are utilized.

Figure 11:
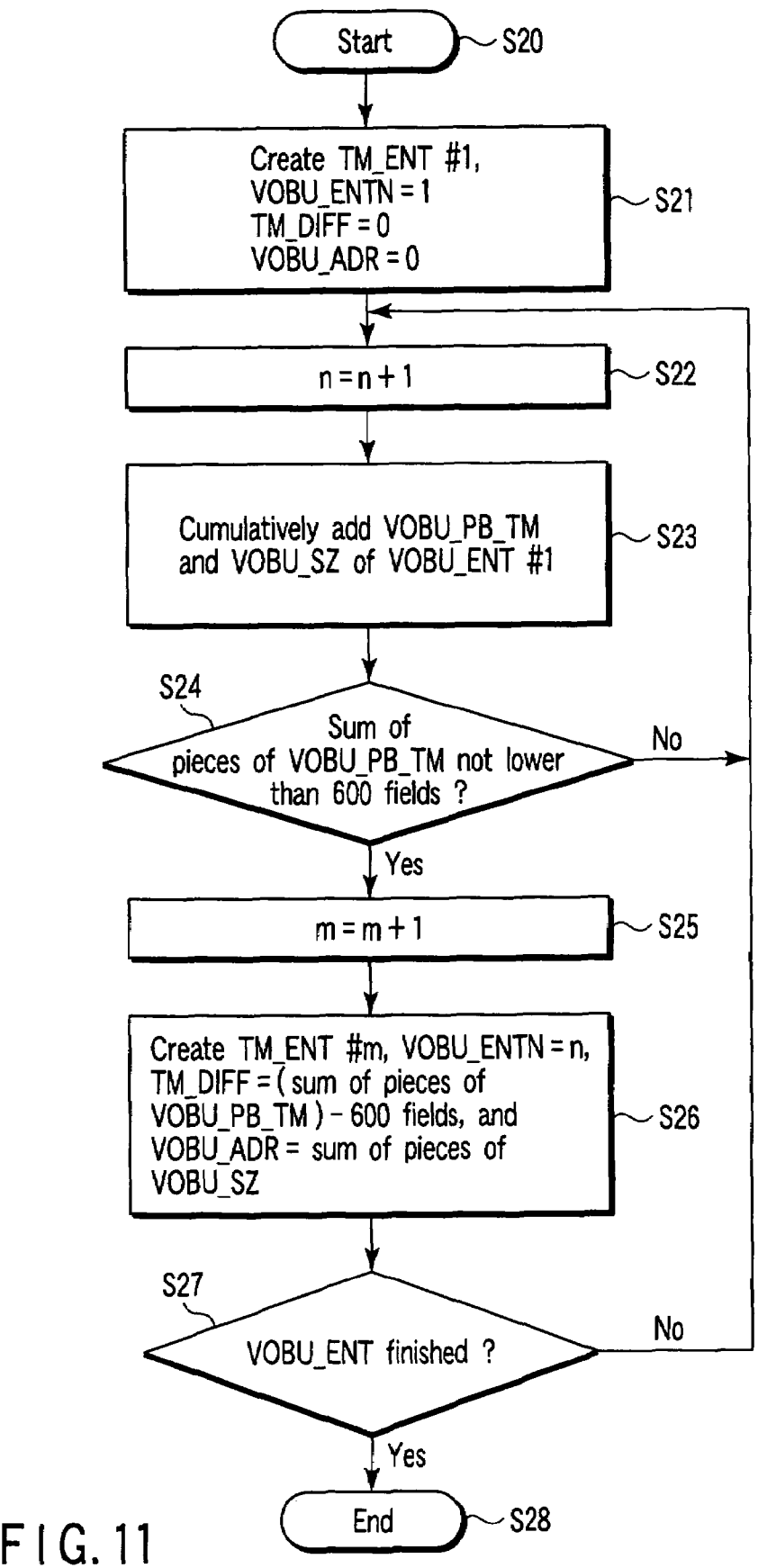
FIG. 11 is a flowchart showing the operation in which TM_ENT is generated from VOBU_ENT in the embodiment.

FIG. 11 is the flowchart showing the operation in which TM_ENT is generated based on VOBU_ENT which has been read from RDI_PCK of the stream. When the process is started (Step S20), in Step S21 the CPU 32 creates TM_ENT #1, assuming that VOBU_ENTN=1, TM_DIFF=0, and VOBU_ADR=0.

In Step S22, the CPU 32 adds +1 to n. In Step S23, while the CPU 32 performs cumulative addition of the pieces of VOBU_PB_TM of VOBU_ENT #n, the CPU 32 performs the cumulative addition VOBU_SZ.

In Step S24, the CPU 32 decides whether the sum of the pieces of VOBU_PB_TM is not lower than 600 fields which are of the interval of TM_ENT in the NTSC system or not. When the CPU 32 decides that the sum of the pieces of VOBU_PB_TM is lower than 600 fields (NO), the CPU 32 returns the process to Step S22.

When the CPU 32 decides that the sum of the pieces of VOBU_PB_TM is not lower than 600 fields in Step S24 (YES), the CPU 32 adds +1 to m in Step S25 and creates TM_ENT #m in Step S26.

In this case, TM_ENT #m is calculated assuming that:
VOBU_ENTN=n,
TM_DIFF=(the sum of the pieces of VOBU_PB_TM)−600 Fields, and
VOBU_ADR=the sum of the pieces of VOBU_SZ.

In Step S27, the CPU 32 decides whether VOBU_ENT is finished or not. When the CPU 32 decides that VOBU_ENT is not finished (NO), the CPU returns the process to Step S22. When the CPU 32 decides that VOBU_ENT is finished (YES), the process is ended (Step S28).

In accordance with the above-described embodiment, each of the information 1STREF_SZ, the information VOBU_PB_TM, and the information VOBU_SZ which constitute VOBU_ENT is recorded in RDI_PCK of the stream, so that each of the information VOBU_ENTN, the information TM_DIFF, and the information VOBU_ADR which constitute TM_ENT from VOBU_ENT can be calculated without reading the header portions of all the packets of the stream and the management information of the stream can be easily restored from the stream.

It is practical that the process of restoring TM_ENT is performed only when the management information recorded in the management area of the hard disk 25a or optical disk 26 is inconsistent with the stream, i.e. only when the management information of the management area is lost.

The invention is not limited to the embodiment. In the working stage of the invention, it is possible to realize the invention by deforming the constituents in various manners without departing from the spirit and scope of the invention. Further, various inventions can be formed by appropriately combining the plurality of constituents disclosed in the embodiment. For example, it is possible to delete some constituents from all the constituents shown in the embodiment.

What is claimed is:

1. An information recording apparatus comprising:
a reception unit configured to receive image signals;
a stream generation unit configured to generate a stream formed by continuously arranging a plurality of pieces of VOBU adhering to a DVD-VR standard from the image signals received by the reception unit;
a management information generation unit configured to generate management information of the stream generated by the stream generation unit;
a control unit configured to arrange part of the management information generated by the management information generation unit in each reserve area in a plurality of pieces of VOBU constituting the stream; and
a recording unit configured to record the stream in which part of the management information is arranged by the control unit and the management information in a recording medium.

2. An information recording apparatus according to claim 1, wherein the control unit is configured to arrange navigation information in the management information generated by the management information generation unit in each reserve area in the plurality of pieces of VOBU constituting the stream, the navigation information searching specific data in the stream.

3. An information recording apparatus according to claim 1, wherein the control unit is configured to arrange information in which another part of the management information can be restored by performing predetermined arithmetic processing in the management information generated by the management information generation unit in each reserve area in the plurality of pieces of VOBU constituting the stream.

4. An information recording apparatus according to claim 1, wherein the control unit is configured to arrange information constituting VOBU_ENT adhering to the DVD-VR standard in the management information generated by the management information generation unit in each reserve area in the plurality of pieces of VOBU constituting the stream.

5. An information recording apparatus according to claim 1, wherein the control unit is configured to record part of the management information generated by the management information generation unit in an MNFI area of RDI_PCK adhering to the DVD-VR standard.

6. An information recording apparatus according to claim 1, wherein the control unit is configured to arrange VOBU_ENT in the management information generated by the management information generation unit in the MNFI area of RDI_PCK in the plurality of pieces of VOBU constituting the stream.

7. An information recording apparatus according to claim 6, wherein the control unit is configured to arrange VOBU_ENT including 1STREF_SZ, VOBU_PB_TM, and VOBU_SZ in the MNFI area of RDI_PCK in the plurality of pieces of VOBU constituting the stream.

8. An information recording apparatus according to claim 1, further comprising;
a stream reproduction unit configured to reproduce the recorded stream from the recording medium,
a management information fetch unit configured to fetch part of the management information from each reserve area in the plurality of pieces of VOBU constituting the stream reproduced by the stream reproduction unit, and
a management information restoration unit configured to perform the predetermined arithmetic processing on part of the management information fetched by the management information restoration unit to restore other part of the management information.

9. An information recording apparatus according to claim 8, further comprising a management information recording unit configured to record part of the management information fetched by the management information fetch unit and another part of the management information restored by the management information restoration unit in an area where the management information of the recording medium is recorded.

10. An information recording apparatus according to claim 8, wherein part of the management information fetched by the management information fetch unit and another part of the management information restored by the management information restoration unit are the navigation information for searching the specific data in the stream.

11. An information recording apparatus according to claim 8, wherein part of the management information fetched by the management information fetch unit is VOBU_ENT adhering to the DVD-VR standard, and another part of the management information restored by the management information restoration unit is TM_ENT adhering to the DVD-VR standard.

12. An information recording apparatus comprising:
a reception unit configured to receive image signals;
a stream generation unit configured to generate a stream formed by continuously arranging a plurality of pieces of VOBU adhering to a DVD-VR standard from the image signals received by the reception unit;
a management information generation unit configured to generate management information of the stream generated by the stream generation unit;
a control unit configured to arrange VOBU_ENT in the management information generated by the management information generation unit in each MNFI area of RDI_PCK in a plurality of pieces of VOBU constituting the stream;
a recording unit configured to record the stream in which VOBU_ENT is arranged in the MNFI area of RDI_PCK by the control unit and the management information in a recording medium;
a stream reproduction unit configured to reproduce the recorded stream from the recording medium;
a management information fetch unit configured to fetch VOBU_ENT from the MNFI area of RDI_PCK in the plurality of pieces of VOBU constituting the stream reproduced by the stream reproduction unit; and
a management information restoration unit configured to perform a predetermined arithmetic processing to VOBU_ENT fetched by the management information restoration unit and to restore TM_ENT.

13. An information recording method comprising:
receiving image signals;
generating a stream formed by continuously arranging a plurality of pieces of VOBU adhering to a DVD-VR standard from the received image signals;
generating management information of the generated stream;
arranging part of the generated management information in each reserve area in a plurality of pieces of VOBU constituting the stream; and
recording the stream in which part of the management information is arranged and the management information in a recording medium.

14. An information recording method according to claim 13, further comprising:
reproducing the recorded stream from the recording medium;
fetching part of the management information from each reserve area in the plurality of pieces of VOBU constituting the reproduced stream; and
performing the predetermined arithmetic processing on part of the fetched management information to restore another part of the management information.

* * * * *